United States Patent [19]

Miyake et al.

[11] Patent Number: 5,307,691

[45] Date of Patent: * May 3, 1994

[54] TORQUE TRANSDUCER

[75] Inventors: Katsuyuki Miyake, Shiga; Tomoyoshi Sawada, Tsuyama; Mutsumi Sunahata, Sakai, all of Japan

[73] Assignee: Kubota Corporation, Osaka, Japan

[*] Notice: The portion of the term of this patent subsequent to Oct. 26, 2000 has been disclaimed.

[21] Appl. No.: 951,141

[22] Filed: Sep. 25, 1992

Related U.S. Application Data

[63] Continuation-in-part of Ser. No. 721,147, Jun. 26, 1991, Pat. No. 5,255,567.

Foreign Application Priority Data

| Jun. 30, 1990 | [JP] | Japan | 2-69787 |
| Jun. 30, 1990 | [JP] | Japan | 2-173159 |
| Jun. 30, 1990 | [JP] | Japan | 2-173160 |
| Jun. 30, 1990 | [JP] | Japan | 2-173161 |
| Sep. 27, 1991 | [JP] | Japan | 3-276744 |

[51] Int. Cl.$^5$ ............................................. G01L 3/02
[52] U.S. Cl. ............................ 73/862.333; 73/862.334; 73/862.335
[58] Field of Search ................ 73/862.333, 862.334, 73/862.335

[56] References Cited

U.S. PATENT DOCUMENTS

| 4,760,745 | 8/1988 | Garshelis | 73/862.333 |
| 4,817,444 | 4/1989 | Yagi et al. | 73/DIG. 2 X |
| 4,907,462 | 3/1990 | Obama et al. | 73/862.333 |

Primary Examiner—Richard E. Chilcot, Jr.
Assistant Examiner—Elizabeth L. Dougherty
Attorney, Agent, or Firm—McCormick, Paulding & Huber

[57] ABSTRACT

A torque transducer including a ferromagneto-stricting device provided for a rotational shaft, a magnetic field supply device for supplying a magnetic field to the ferromagneto-stricting device, a sensing device for sensing a change in the magnetic permeability of the ferromagneto-stricting device caused by torque applied to the rotational shaft, a fixed housing for rotatably supporting the rotational shaft, an electromagnetic shielding device for electrically shielding the magnetic field supply device and the sensing device, and a spacer interposed between the fixed housing and the electromagnetic shielding device for causing the electromagnetic shielding device to be held in the fixed housing.

18 Claims, 7 Drawing Sheets

TORQUE TRANSDUCER

RELATED APPLICATION

This application is a continuation-in-part of prior application Ser. No. 07/721,147, filed on Jun. 26, 1991, now U.S. Pat. No. 5,255,567.

FIELD OF THE INVENTION

The present invention relates to improvement in a non-contact type torque transducer for measuring torque acting on a rotational shaft.

DESCRIPTION OF THE RELATED ART

U.S. Pat. No. 4,760,745 discloses an example of a torque transducer of the above-described type, which will be described with reference to FIGS. 17 and 18. The known torque transducer includes a pair of annular bands a and b possessing magnetic anisotropy distributed in two different helical directions which are mutually symmetrical. The annular bands a and b are provided around surface portions of a rotational shaft c at a certain interval in the axial direction thereof.

A pair of bobbins d and e, coaxial with the rotational shaft c, surround the annular bands a and b. Two pairs of coils f and g, and h and i are wound on the bobbins d and e. The coils f and h are exciting coils serially connected to each other and driven with alternating current (AC). The coils g and i are sensing coils serially connected to each other in opposite directions for sensing the difference in magnetic flux passing through the two annular bands. The torque transducer also includes a magnetic shielding yoke j made of a ferrite material.

The exciting coils f and h are supplied with power from an AC power supply k. Electromotive force induced by the sensing coils g and i, connected together in opposite directions, is rectified by a rectifier m, and then displayed on a voltage display n. The black dots shown in FIG. 18 indicate the polarities of the coils.

When no torque is applied to the rotational shaft c, the stress in the annular band a and that in the annular band b are symmetric with and equivalent to each other. Under this condition, therefore, substantially no output signal is generated from the rectifier m even if AC current is supplied to the exciting coils f and h.

However, when torque is applied to the rotational shaft c, the annular bands a and b are respectively subjected to tensile stress and compression stress. As a result, the magnetic permeability of either annular band a or b is increased, while that of the other annular band is reduced. Accordingly, the magnetic flux passing through either annular band 12 or 14 is increased, while that passing through the other is reduced. Therefore, the level of voltage induced by one of the sensing coils is higher than that of voltage induced by the other sensing coil. Consequently, an output signal corresponding to the difference between the levels of induced voltage, that is, an output signal in proportion to the applied torque, is obtained. The output signal is converted by the rectifier m into direct current (DC) voltage having a level corresponding to the magnitude of the torque. The thus obtained output of the rectifier m has a polarity, which is indicative of the direction of the applied torque.

In a torque transducer, such as above, which is to detect a torque value in a state of non-contacting the associated rotational shaft, it is necessary that the deflection of the rotational shaft with respect to the exciting coils and the sensing coils be maintained at a sufficiently low level in order to accurately detect the value of torque acting on the rotational shaft. Further, the level of accuracy with which a torque value is detected may be adversely affected if the exciting coils and/or the sensing coils are subjected to stress generated therein in excess of a certain allowable limit (such as thermal stress due to temperature changes and/or fitting stress due to manufacturing tolerance of various component parts), or subjected to influence exerted thereon in excess of a certain allowable limit by the deformation, displacement and/or vibration of the rotational shaft.

However, conventional technology has not fully succeeded in providing satisfactory means for coping with the above circumstances.

A magnetic shielding yoke, made of a material having a high magnetic permeability (such as Permalloy or silicon-steel plate), generally has a characteristic in which the magnetic permeability of the magnetic shielding yoke changes when stress is applied on it. The permeability of such a magnetic shielding yoke changes when the yoke is subjected to stress as a result of stress generated therein in excess of a certain allowable limit (such as thermal stress determined by the difference in coefficient of thermal expansion between various members at the time of a temperature change and/or fitting stress due to manufacturing tolerance of various members), or of influence exerted thereon in excess of a certain allowable limit by the deformation, displacement and/or vibration of the rotational shaft. Such a change causes a variation in the output of the torque sensor.

SUMMARY OF THE INVENTION

A first object of the present invention is to provide a torque transducer capable of minimizing the deflection of the rotational shaft with respect to exciting and sensing coils, and which is also capable of minimizing the influence of changes in the environmental temperature exerted on electromagnetic shielding means and the exciting and sensing coils.

A second object of the present invention is to provide a torque transducer capable of preventing the electromagnetic shielding means from being subjected to irrelevant stress, to thereby enable accurate detection of the magnitude of torque acting on the rotational shaft.

A third object of the present invention is to provide a torque transducer capable of facilitating the assembly of the electromagnetic shielding means onto the exciting and sensing coils.

A fourth object of the present invention is to provide a torque transducer capable of facilitating the assembly of the electromagnetic shielding means or the exciting and sensing coils onto a fixed housing.

A fifth object of the present invention is to provide a torque transducer capable of providing a reliable electrical shield between the electromagnetic shielding means and the fixed housing.

Other and further objects, features and advantages of the invention will appear more fully from the following description.

DETAILED DESCRIPTION OF PREFERRED EMBODIMENTS

Preferred embodiments of a torque transducer according the present invention will now be described with reference to the drawings.

Figure 1:
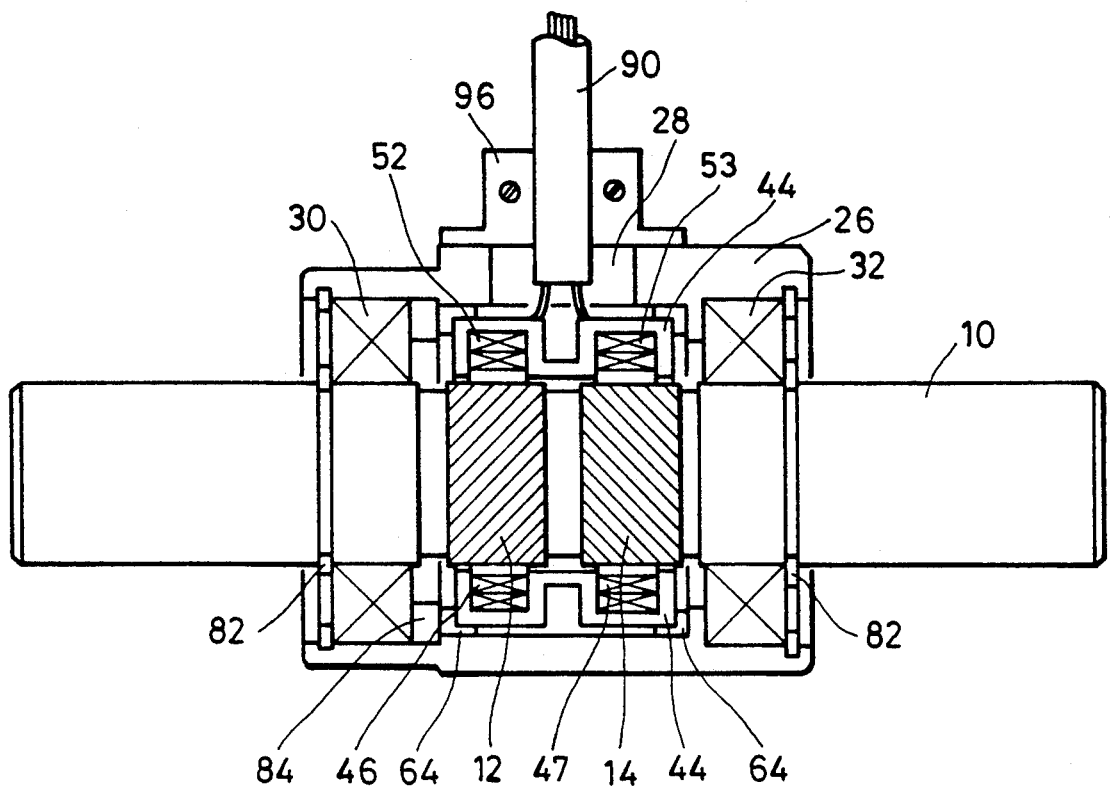
FIG. 1 is a sectional view showing an embodiment of a torque transducer according to the present invention.

Referring to FIG. 1, a torque transducer includes a ferromagneto-striction means provided for a rotational shaft 10. Specifically, the rotational shaft 10 is made of a ferromagneto strictive material, and annular bands 12 and 14, possessing magnetic anisotropy distributed in two different helical directions which are axisymmetrical with each other, are provided at positions separated from each other in the axial direction of the rotational shaft 10. The annular bands 12 and 14 are provided around the outer peripheral surface of a central portion of the rotational shaft 10, and they each have knurls formed on the outer surface thereof, the knurls being composed of a multiplicity of helical grooves 16 forming an angle of +45 or −45 degrees with respect to the axis. These helical grooves 16 allow the annular bands 12 and 14 to exhibit the above-described magnetic anisotropy. It is not always necessary that the entire rotational shaft 10 be made of a ferromagneto-strictive material. For instance, only a portion of the rotational shaft 10 including the surface portion at which the annular bands 12 and 14 are to be provided may be made of a ferromagneto-strictive material. Alternatively, a ferromagneto-strictive material in a band-shape may be attached to the relevant surface portion.

A fixed housing 26 is a radially outward structure disposed around a portion of the rotational shaft 10 where the annular bands 12 and 14 are provided. The fixed housing 26 is made of a metal material, such as aluminum, and has a substantially hollow cylindrical shape. A through hole 28 is formed through a side wall portion of the fixed housing 26, and wires for establishing electrical connection of exciting coils and sensing coils (described later) are passed through the through hole 28. The rotational shaft 10 extends through the inside of the fixed housing 26, and portions of the rotational shaft 10 which are axially outward of the annular bands 12 and 14 are supported by the fixed housing 26 via ball bearings 30 and 32 in such a manner that the rotational shaft 10 is rotatable.

A magnetic shielding yoke 44 (constituting the magnetic shielding means) is disposed inside the fixed housing 26. The magnetic shielding yoke 44 may be made of a material having a high magnetic permeability, such as Permalloy. The magnetic shielding yoke 44 is divided into two pieces which cooperate with each other to accommodate a plurality of cylindrical bobbins. These bobbins comprise a pair of bobbins 46 and 47 for exciting coils, and a pair of bobbins 52 and 53 for sensing coils. The sensing-coil bobbins 52 and 53 are secured by adhesion to the inner surface of the yoke 44 at axially-separated positions. The exciting-coil bobbins 46 and 47 are coaxially fitted into the sensing-coil bobbins 52 and 53, respectively, and secured by adhesion to the inner surfaces of the bobbins 52 and 53. Exciting coils are wound around the exciting-coil bobbins 46 and 47 (thus completing magnetic field supply means), and sensing coils are wound around the sensing-coil bobbins 52 and 53 (thus completing sensing means).

The magnetic shielding yoke 44 is held in place within the fixed housing 26 by annular spacer means 64 having elasticity. The holding by the spacer 64 allows the magnetic shielding yoke 44 to surround the exciting coils and the sensing coils in such a manner that these coils are coaxial with the rotational shaft 10 and in a state of non-contacting the annular bands 12 and 14.

Figure 2:
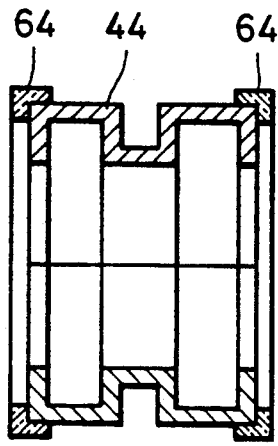
FIG. 2 is a sectional view of the essential parts of the torque transducer shown in FIG. 1, the essential parts being shown in their assembled state.
Figure 3:
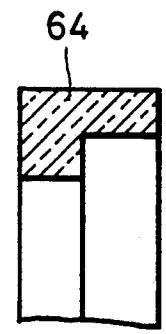
FIG. 3 is a fragmentary, enlarged sectional view of the essential parts shown in FIG. 2.
Figure 4:
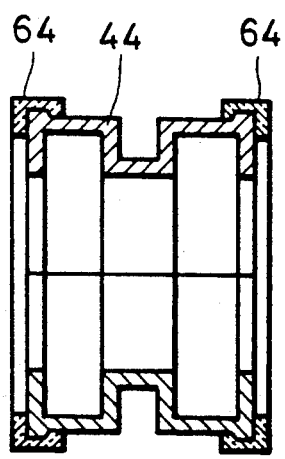
FIGS. 4 and 5 are a sectional view and a fragmentary, enlarged sectional view, respectively, showing a first modification of the essential parts shown in FIG. 2.
Figure 5:
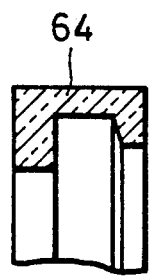
Figure 6:
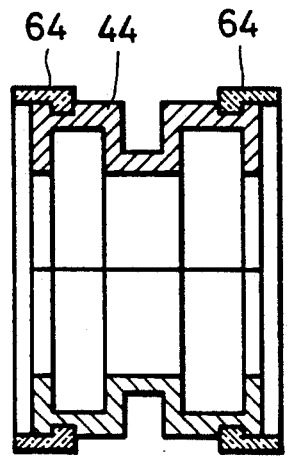
FIGS. 6 and 7 are a sectional view and a fragmentary, enlarged sectional view, respectively, showing a second modification of the essential parts shown in FIG. 2.
Figure 7:
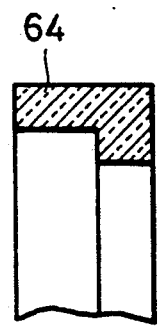
Figure 8:
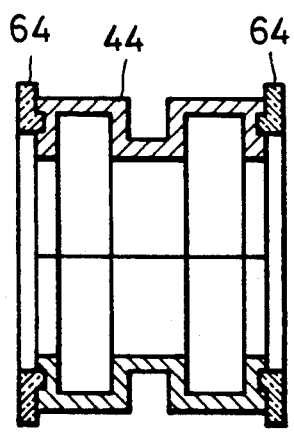
FIGS. 8 and 9 are a sectional view and a fragmentary, enlarged sectional view, respectively, showing a third modification of the essential parts shown in FIG. 2.
Figure 9:
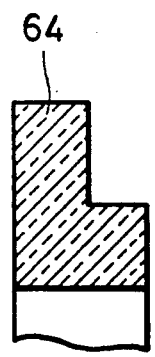
Figure 10:
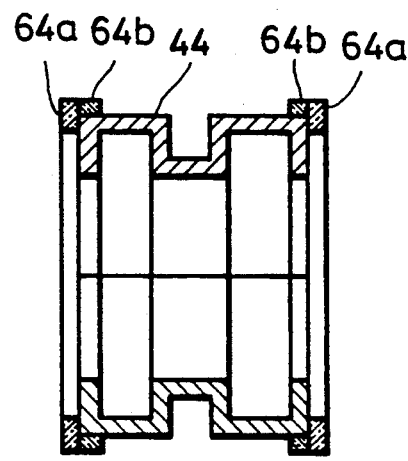
FIGS. 10 and 11 are a sectional view and a fragmentary, enlarged sectional view, respectively, showing a fourth modification of the essential parts shown in FIG. 2.
Figure 11:
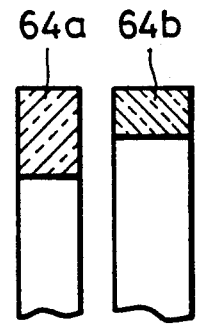
Figure 12:
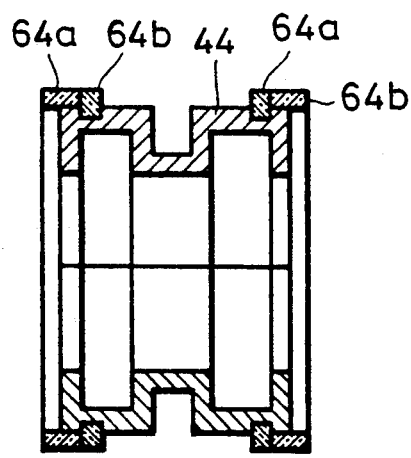
FIGS. 12 and 13 are a sectional view and a fragmentary, enlarged sectional view, respectively, showing a fifth modification of the essential parts shown in FIG. 2.
Figure 13:
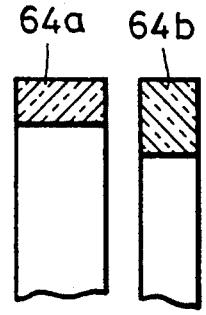

FIGS. 2 and 3 show the construction of an embodiment of the spacer means 64. The spacer 64 comprises spacer elements each having a cylinder portion substantially parallel with the outer periphery of the substantially cylindrical magnetic shielding yoke 44 (i.e., substantially parallel with the axis thereof), and an annular flat-plate portion substantially parallel with the axial end faces of the magnetic shielding yoke 44 (i.e., substantially perpendicular to the axis thereof), the spacer elements having a substantially hook-shaped cross-sectional configuration. The spacer elements are provided at the axial end portions of the magnetic shielding yoke 44. The inner peripheral surface of the cylinder portion of each spacer element serves as a second restraining surface for preventing radial movement of the electromagnetic shielding yoke 44, and the inner surface of the flat-plate portion of each spacer element serves as a first restraining surface for preventing axial movement of the electromagnetic shielding yoke 44. With the above construction, the magnetic shielding yoke 44 is securely held by the spacer 64 comprising a pair of elements. In this embodiment of the spacer 64, the flat-plate portion of each spacer element projects axially outward from the mated end face of the electromagnetic shielding yoke 44 (thus serving as a first projection) while the cylinder portion of the spacer element projects radially outward from the mated position of the outer peripheral surface of the electromagnetic shielding yoke 44 (thus serving as a second projection). This arrangement allows the electromagnetic shielding yoke 44 to be securely held in position by the spacer 64 within the fixed housing 26.

The construction shown in FIGS. 2 and 3 may be substituted by other constructions shown in FIGS. 4 through 9. In a modification shown in FIGS. 4 and 5, the electromagnetic shielding yoke 44 has annular projections projecting radially outward at either axial end thereof. On the other hand, the cylinder portion of each spacer element of the spacer 64 has an annular recess formed in the inner peripheral surface thereof and capable of engaging with the annular projection of the yoke 44. In another modification shown in FIGS. 6 and 7, the electromagnetic shielding yoke 44 has annular grooves formed in outer peripheral surface portions at either end thereof, and the spacer 64 includes annular projections capable of fitting into the corresponding annular grooves. In still another modification shown in FIGS. 8 and 9, the electromagnetic shielding yoke 44 has ring-shaped grooves formed in either end face thereof, and the spacer 64 includes projections capable of fitting into the corresponding ring-shaped grooves.

The spacer 64 may be made of a material such as a high molecular compound, natural rubber, or a composite material thereof with a metal. It is preferable that the material of the spacer 64 is capable of compensating, to a certain extent, for the difference in coefficient of thermal expansion between various members, and for manufacturing tolerance of various members. Further, in order to minimize limitations of the variety of objects to which the torque transducer is applicable and locations at which it is usable, the spacer 64 is preferably made of a material which is high-temperature resistant to a certain extent, and which is oil resistant. Further, it is preferable to form the spacer 64 with an insulating material.

When the torque transducer is to be installed at a location where the humidity is high or there is an electrically conductive gas, it is preferable, from the view point of assuring a satisfactory level of reliability, that the spacer be made of an electrically conductive material so that the electrical conductivity of the electromagnetic shielding member and the other part of the interior of the fixed housing brings about a completely electrically-conductive condition from the beginning.

In the above-described embodiments of the spacer 64, each spacer element consists of an integral structure having a substantially hook-shaped cross-sectional configuration. However, the spacer 64 may, of course, comprise elements consisting of separate members, as shown in FIGS. 10 to 13. In these embodiments, each element of the spacer 64 is divided into an annular flat-plate portion 64a substantially parallel with a plane perpendicular to the axis of the electromagnetic shielding yoke 44, and a cylinder portion 64b substantially parallel with the outer peripheral surface of the yoke 44. If the flat-plate portion 64a and the cylinder portion 64b are formed into separate members in this way, these portions may have different levels of elasticity or different dimensions of wall thickness so as to provide an advantageous support for the electromagnetic shielding yoke 44.

Figure 14:
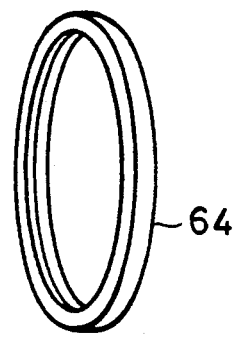
FIG. 14 is a perspective view of the essential parts of the torque transducer shown in FIG. 1.
Figure 15:
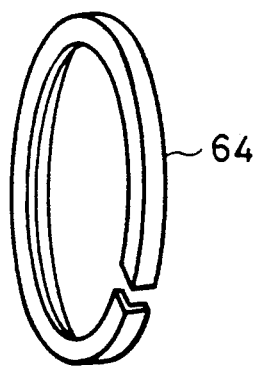
FIG. 15 is a perspective view showing a modification of the essential parts shown in FIG. 14.

Each element of the spacer 64 may be either ring-shaped, as shown in FIG. 14, or string-shaped, as shown in FIG. 15, by omitting a part of the ring shape.

Figure 16:
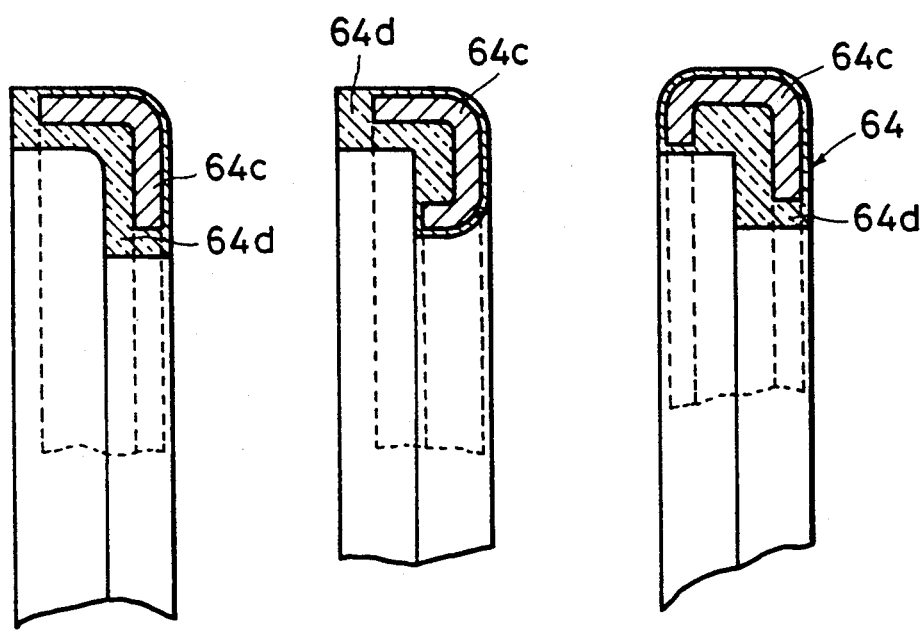
FIGS. 16-A to 16-C are fragmentary, enlarged sectional views showing various modifications of the essential parts of the torque transducer shown in FIG. 1.
Figure 17:
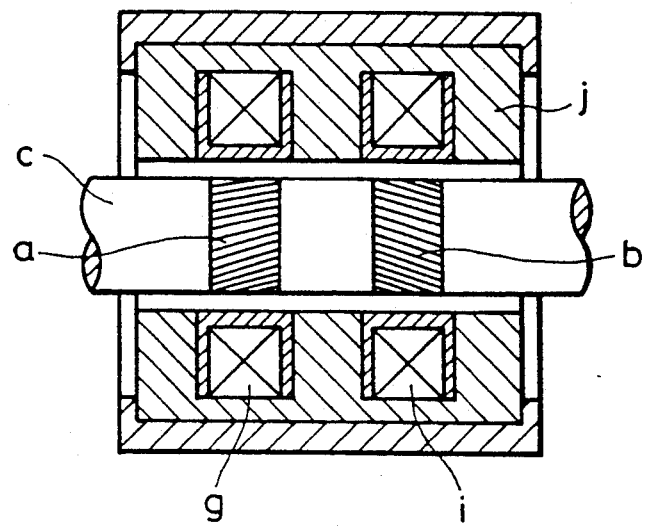
FIG. 17 is a sectional view showing the relevant parts of a conventional torque transducer.
Figure 18:
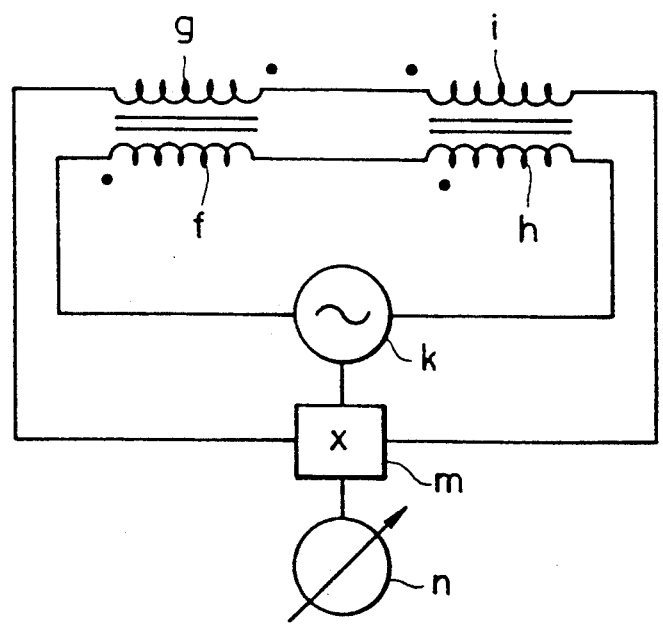
FIG. 18 is a circuit diagram schematically showing an electrical circuit for the conventional torque transducer.

The spacer 64 may have constructions shown in FIGS. 16-A to 16-C. In these embodiments, the spacer 64 includes an inward first member 64c and an outward second member 64d, the second member 64d covering the first member 64c. The first member 64c of the spacer 64 is made of a material having a relatively small elasticity while the second member 64d is made of a material having a relatively great elasticity, thereby enabling the rigidity of the spacer 64 to be increased. It is preferable that the first member 64c is made of such a non-magnetic metal of high rigidity as stainless steel (e.g., JIS SUS304) and the second member 64d is made of such an elastic material as acrylonitrile-butadiene rubber.

The fitting relationship between the spacer 64 and the electromagnetic shielding yoke 44 as well as the fitting relationship between the spacer 64 and the fixed housing 26 may employ suitable dimensions in accordance with the elasticity of the spacer 64. In the embodiments of the present invention, the spacer 64 has an inner radius 0.2 to 0.4 mm smaller than the outer radius of that portion of the electromagnetic shielding yoke 44 on which the spacer 64 is to be fitted. As a result, when the spacer 64 and the electromagnetic shielding yoke 44 are assembled together, the resultant spacer-yoke fitting relationship involves an initial tensile stress generated in the spacer 64. The electromagnetic shielding yoke 44, the spacer 64 and the fixed housing 26 are assembled onto each other in the following manner: the spacer 64 is assembled onto the electromagnetic shielding yoke 44, and then the resultant assembly is fitted into the fixed housing 26. In the second process, the fitting is achieved by causing the spacer 64 to be compressed in the fixed housing 26.

A pair of C-rings 82 are fitted in grooves formed at positions of the outer peripheral surface of the rotational shaft 10 which are axially outward of the ball bearings 30 and 32. Further, an annular spacer 84 is disposed between the spacer 64 and the ball bearing 30 at a left-hand position, as viewed in FIG. 1.

A shielded cable 90 is passed through the through hole 28 of the fixed housing 26, and extended to the outside of the apparatus. The cable 90 is held by the fixed housing 26 via a cable retainer 96 secured to the fixed housing 26.

When no torque is applied to the rotational shaft 10, the stress in the annular band 12 and that in the annular band 14 are symmetric with and equivalent to each other. Under this condition, therefore, substantially no output signal is generated from the rectifier m even if AC current is supplied to the exciting coils. In this case, the magnetic permeability of the annular band 12 and that of the annular band 14 are equal to each other, and the voltages induced by the corresponding sensing coils have levels equivalent to each other and polarities opposite to each other, thereby cancelling each other.

However, when torque is applied to the rotational shaft 10, the annular bands 12 and 14 are respectively subjected to tensile stress and compression stress. As a result, the magnetic permeability of either annular band 12 or 14 is increased, while that of the other annular band is reduced. Accordingly, the magnetic flux passing through either annular band 12 or 14 is increased, while that passing through the other is reduced. Therefore, the level of voltage induced by one of the sensing coils is higher than that of voltage induced by the other sensing coil. Consequently, an output signal corresponding to the difference between the levels of induced voltage, that is, an output signal in proportion to the applied torque, is obtained. The output signal is converted by the rectifier m into DC voltage having a level corresponding to the magnitude of the torque. The thus obtained output of the rectifier m has a polarity, which is indicative of the direction of the applied torque (clockwise or counter-clockwise).

Since the rotational shaft 10 is rotatably supported by the fixed housing 26 via the ball bearings 30 and 32, the rotational shaft 10, at least that portion of the rotational shaft 10 which is provided with the annular bands 12 and 14, is prevented from any substantial deflection relative to the fixed housing 26. Furthermore, since the electromagnetic shielding yoke 44 is held by the spacer 64 in the fixed housing 26 in such a manner as to be prevented from any axial and radial movement, the above portion of the rotational shaft 10 is prevented from any substantial deflection relative to the electromagnetic shielding yoke 44 as well as to the exciting and sensing coils secured inside the yoke 44.

The magnetic shielding yoke 44 as well as the exciting and sensing coils secured inside the yoke are provided by virtue of the spacer 64 in such a manner as to be separated from the rotational shaft 10 and the fixed housing 26 which are to be directly exposed to changes in the environmental temperature. Therefore, the yoke 44 as well as the coils therein are prevented from being subjected to any substantial changes in environmental temperature.

The electromagnetic shielding yoke 44 is held in place within the fixed housing 26 by the spacer 64 possessing relatively high elasticity in such a manner as to be prevented from any axial and radial movement. Therefore, the electromagnetic shielding yoke 44 as well as the exciting and sensing coils are prevented from being subjected to stress as a result of thermal stress due to temperature changes and/or assembly stress due to manufacturing tolerance of various members. Further, the deformation, displacement or vibration of the rotational shaft 10 is prevented from being transmitted to the electromagnetic shielding yoke 44 and the exciting and sensing coils through the ball bearings 30 and 32 and the fixed housing 26, hence, from influencing the above components.

The exciting and sensing coils, the electromagnetic shielding yoke 44, and the spacer 64 can be assembled together by causing the coils to be secured inside the two-piece electromagnetic shielding yoke 44 and then fitting the spacer 64 onto the yoke 44. Therefore, there is no need to provide any special means for assembling these components.

The electromagnetic shielding yoke 44 is held in place within the fixed housing 26 by the elastic spacer 64 interposed therebetween. Therefore, the assembly of the yoke 44 onto the housing 26 (insertion-fitting of the yoke 44 into the housing 26) can be performed easily and precisely.

With the above-described torque transducer, it is possible to prevent irrelevant stress as a result of thermal stress due to temperature changes and/or fitting stress due to manufacturing tolerance of various members from being generated in excess of a certain allowable limit, and to prevent influence of the deformation, displacement and vibration of the rotational shaft from being exerted in excess of a certain allowable limit. Accordingly, it is possible to accurately detect the magnitude of torque acting on the rotational shaft.

When the electromagnetic shielding yoke 44 is divided into two pieces, these pieces can be rigidly integrated together in a stable manner by a spacer having a hook-shaped cross-section. In this way, the operation of assembling the torque transducer can be facilitated.

We claim

1. A torque transducer comprising:

ferromagneto-stricting means provided for a rotational shaft and acting to change the magnetic permeability thereof in accordance with torque applied to said rotational shaft;

magnetic field supply means for supplying a magnetic field to said ferromagneto-stricting means;

sensing means for sensing a change in the magnetic permeability caused by the torque applied to said rotational shaft;

converting means for converting the detected change in the magnetic permeability into an electrical signal;

a fixed housing for rotatably supporting said rotational shaft with bearing means therebetween;

electromagnetic shielding means for surrounding and holding in place said magnetic field supply means and said sensing means in such a manner as to electrically shield them; and a spacer interposed between said fixed housing and said electromagnetic shielding means for causing said electromagnetic shielding means to be held in said fixed housing.

2. A torque transducer according to claim 1, wherein said spacer is made of a material having a greater elasticity than a material forming said electromagnetic shielding means.

3. A torque transducer according to claim 1, wherein said spacer is made of an electrically non-conductive material.

4. A torque transducer according to claim 1, wherein said spacer is made of an electrically conductive material.

5. A torque transducer according to claim 1, wherein said electromagnetic shielding means has a substantially hollow cylindrical shape, said spacer being provided on the outer periphery of said electromagnetic shielding means.

6. A torque transducer according to claim 5, wherein said spacer comprises a plurality of spacer elements disposed on outer peripheral portions of said electromagnetic shielding means at a certain interval in the axial direction thereof.

7. A torque transducer according to claim 5, wherein said spacer is fitted in an annular groove formed in the outer peripheral surface of said electromagnetic shielding means.

8. A torque transducer according to claim 1, wherein said spacer comprises two spacer elements arranged at an interval in the axial direction of said electromagnetic shielding means.

9. A torque transducer according to claim 8, wherein said spacer elements of said spacer are disposed on either axial end of said electromagnetic shielding means, said spacer elements including a first projection projecting axially outward from the mated end face of said electromagnetic shielding means, and a second projection projecting radially outward from the mated position of the outer peripheral surface of said electromagnetic shielding means.

10. A torque transducer according to claim 1, wherein said spacer includes a first restraining surface for preventing axial movement of said electromagnetic shielding means, and a second restraining surface for preventing radial movement of said electromagnetic shielding means.

11. A torque transducer according to claim 1, wherein said electromagnetic shielding means has a substantially hollow cylindrical shape, said spacer including a cylinder portion substantially parallel with the outer peripheral surface of said electromagnetic shielding means, and a ring portion substantially parallel with the end faces of said electromagnetic shielding means.

12. A torque transducer according to claim 11, wherein said cylinder portion and said ring portion of said spacer have different levels of elasticity.

13. A torque transducer according to claim 11, wherein said cylinder portion and said ring portion of said spacer are formed into an integral structure, said structure having a hooked cross-sectional configuration.

14. A torque transducer according to claim 11, wherein said cylinder portion and said ring portion of said spacer are separate members.

15. A torque transducer according to claim 11, wherein said cylinder portion and said ring portion of said spacer have different dimensions of wall thickness.

16. A torque transducer according to claim 1, wherein said spacer comprises a plurality of members having different levels of elasticity.

17. A torque transducer according to claim 1, wherein said spacer is ring-shaped.

18. A torque transducer according to claim 1, wherein said spacer is parti-circular.

* * * * *

UNITED STATES PATENT AND TRADEMARK OFFICE
CERTIFICATE OF CORRECTION

PATENT NO. : 5,307,691
DATED : May 3, 1994
INVENTOR(S) : Miyake et al.

It is certified that error appears in the above-identified patent and that said Letters Patent is hereby corrected as shown below:

On the Title Page, in [*] Notice:

Delete "October 26, 2000" and substitute--October 26, 2010--.

Signed and Sealed this

Twenty-third Day of August, 1994

Attest:

BRUCE LEHMAN

Attesting Officer

Commissioner of Patents and Trademarks